United States Patent Office 2,779,678
Patented Jan. 29, 1957

2,779,678

METHOD OF TREATING COOKED FOOD PRODUCTS

Elmer W. Hamilton, Madison, Wis., assignor to The Froedtert Corporation, a corporation of Wisconsin No Drawing. Application December 29, 1953, Serial No. 401,033

7 Claims. (Cl. 99—100)

The present invention relates to the treatment of starchy food products with malt. It finds particular application to those products known as "potato chips" or "Saratoga chips" which have been cooked in vegetable oils. Also, the invention finds utility in the treatment of such products as popcorn, doughnuts, French fries, crullers, and the like.

A principal object of the invention is the preparation of a storage-stable potato chip or like product which retains its flavor and crispness for markedly longer periods than when prepared in the conventional fashion.

An additional object of the invention is to impart to potato chips and other oil-cooked starchy products, in accordance with the manufacturer's wishes, a distinctive flavor achieved by the addition of nutritious substances.

An additional object of the invention is to materially eliminate from the potato chips and other oil-cooked starchy products the oily taste and the oily feel which characterizes such products when prepared in the conventional fashion.

The invention contemplates the preparation of a new and useful food product by applying malt to a potato chip or other oil-cooked starchy food.

When malt flour, of the character to be described hereinafter, is applied to an oil-cooked starchy food product such as potato chips, there is a physical reaction between the malt and the cooking oil. This physical reaction is believed to be a locking of the oil within the crystalline structure of the maltose from the malt. Malt being hygroscopic in nature, seeks out the water within the cells of the fibrous starchy food product. The maltose of the malt then reacts with the water and crystallizes into a form which partially entraps and seals the surface cooking oils from the air. An additional reaction proceeds, depending upon the concentration of the diastase in the malt, between the diastase and the starch of the food product. The result is believed to further increase the amount of maltose in the food product. This additional maltose may then crystallize and further entrap the cooking oils until the reaction reaches an equilibrium. The results, however, are independent of any theory.

Normally, the production of potato chips proceeds by selecting whole potatoes which are usually stored under controlled conditions of moisture and temperature in order to regulate the starch content and other elements contained in the potatoes. Subsequently, the potatoes are taken from storage and carefully washed, peeled and sliced to the thickness desired by each individual manufacturer. The slices are then washed in a stream of water in order to remove as much of the starch cells as the manufacturer may deem best suited to the particular product he desires to produce.

The slices are then passed into a cooking vat of hot oils. Normally, the manufacturers employ corn, soybean, cotton seed, or such oils as particularly suit their purposes. When the cooked slices are removed from the vat, they are usually placed on a drain rack and salted in accordance with the formula preferred by the individual manufacturer. The excess oil is then permitted to drain off before the product is packaged and marketed.

To increase the storage stability of such potato chips and achieve the further advantages outlined above, malt flour is the applied to the potato chips in such a manner that it becomes physically linked to the potato chip and its oil-cooked surface, as well as adhering by a mechanical adsorption to its surface.

The malt flour may be applied to the potato chips by either tumbling or dusting. Good results have been achieved when approximately one-third to one-half pint of malt flour is consumed for each pound of potato chips treated. Although it is preferred to apply the malt to the potato chips while still warm and prior to packaging, the malt may be applied to a cold potato chip with satisfactory results.

The malt flour contemplated is that which is produced for use in the brewing industry. Such malt flour is generally prepared by steeping grain such as barley, wheat, rye and other cereal grains, in cold water until the grain is substantially soaked, the process requiring some forty to fifty-five hours. The grain is then drained and placed in germinating compartments under a regulated flow of water-saturated air. Thereafter the grain is mechanically maintained in a loose condition and allowed to germinate for five to six days, until the growth of acrospire is equal to the length of the kernel. Then the grain is kiln-dried for forty to forty-eight hours at various temperatures in accordance with the type of malt being prepared. Such malt normally contains diastase, an enzyme, and maltose, a disaccharide sugar.

The nutritional analysis and vitamin content of a malt flour which has been employed in practicing the invention are set forth in the following table:

*Nutritional analysis of malt flour*

|  | Percent by Weight | Grams per Ounce |
|---|---|---|
| Nitrogen free extract (by difference) | 78.83 | 22.35 |
| Protein Content | 11.90 | 3.37 |
| Fat Content | 1.50 | 0.425 |
| Ash Content | 1.26 | 0.357 |
| Crude Fiber | 1.48 | 0.420 |
| Moisture | 5.03 | 1.43 |
|  | 100.00 | 28.352 |

*Vitamin content of malt flour*

International units per ounce
Thiamine ($B_1$) _____ 24.0
Riboflavin (vitamin $B_2$ or G) _____ 9.6
Nicotinic acid _____ 775.0
Pantothenic acid _____ 56.7

It is preferred that the malt which is applied to the cooked product be uncooked itself. Since the malt can be applied at low temperatures, its full nutritional value is preserved when applied to potato chips for human consumption. In addition, it does not tend to rob the original potato chip, or other oil-cooked, starchy food product, of its food value.

One of the difficulties in the processing of ordinary potato chips is to insure an evenness of the spread of salt. Normally, the salt used is finely ground. It is contemplated that the finely divided salt, in the concentration desired by the manufacturer, may be mixed with the malt flour and dusted onto the warm potato chip after leaving the cooking vat.

In addition, it is well known that in reducing diets, the amount of salt intake should be cut down to that commensurate with mineral needs only. Because the addition of malt to the potato chip imparts a new and distinctive flavor to the product, the amount of salt used on the potato chip may be reduced or even eliminated.

Further, it is known that in the preparation of malt flour, and particularly in the roasting stage prior to grinding, different flavors can be imparted by varying the roasting conditions. For example, malt roasted at an elevated temperature has the flavor of cocoa. Thus, it is possible to prepare a malted potato chip which has a marked cocoa or chocolate flavor.

Although one particular embodiment of the invention, namely, the preparation of malted potato chips, has been described in some detail herein, there is no intention to thereby limit the invention to this description. On the contrary, the intention is to cover all modifications, alternative products, usages and equivalents of the invention as fall within its spirit as expressed and defined in the specification and appended claims.

I claim as my invention:

1. A process of preparing storage-stable oil-cooked potato products which comprises treating such potato products with a malt flour in an amount from about 0.33 to about 0.5 pint of malt flour per pound of starchy food product, the malt flour having been admixed with the salt intended for application to the surface of the potato product.

2. A method of inhibiting the decline of freshness and imparting storage stability to oil-cooked starchy food products which comprises treating such products with malt flour in an amount of from about 0.33 to about 0.50 pint of the malt flour per pound of the food product.

3. A process of preparing storage-stable, freshness-retaining, potato products which have been cooked in vegetable oils which comprises treating the same with malt flour in an amount from about 0.33 to about 0.5 part of malt flour per pound of potato products.

4. A method of inhibiting the decline of freshness and imparting storage stability to oil-cooked food products which comprises treating the surface of such products, at a temperature between room temperature and the temperature at which said food products are cooked, with a malt flour in an amount of from about 0.33 to about 0.50 pint of the malt flour per pound of the food product.

5. A method of inhibiting the decline of freshness and improving the overall storage stability of oil-cooked potato chips which comprises the step of treating the same with malt flour in an amount of from about 0.33 to about 0.5 part of malt flour per pound of potato chips.

6. A method of inhibiting the decline of freshness and imparting storage stability to oil-cooked starchy food products which comprises treating the surface of such products with malt flour.

7. A method of inhibiting the decline of freshness and improving the overall storage stability of oil-cooked starchy food products which comprises treating the surface of such food products with malt flour at a temperature between room temperature and the temperature at which such food product is cooked.

References Cited in the file of this patent

UNITED STATES PATENTS

| | | |
|---|---|---|
| 1,385,352 | Allen | July 26, 1921 |
| 1,806,302 | Magrill | May 19, 1931 |
| 2,291,529 | Carbon | July 28, 1942 |

OTHER REFERENCES

"Food Packer," June 1951, page 61, article entitled Improved Processing for Potato Chips.